United States Patent [19]

Martin et al.

[11] Patent Number: 4,845,832
[45] Date of Patent: Jul. 11, 1989

[54] CONTROL FOR LAMINATION STAMPING APPARATUS

[75] Inventors: Benson D. Martin, Pontiac; Eric VonValtier, Plymouth, both of Mich.

[73] Assignee: Carbet Corporation, Pontiac, Mich.

[21] Appl. No.: 199,274

[22] Filed: May 26, 1988

[51] Int. Cl.⁴ .............................................. H02K 15/02
[52] U.S. Cl. .................... 29/564.2; 29/33 L; 29/596; 29/609; 29/738
[58] Field of Search ............ 29/564.2, 564.7, 732, 29/33 L, 33 Q, 596, 598, 609, 564.7, 738, 736; 100/216; 310/42; 83/527, 530, 640, 529; 72/330, 331, 326

[56] References Cited

U.S. PATENT DOCUMENTS

| | | | |
|---|---|---|---|
| 3,823,460 | 7/1974 | Bergmann | 29/738 |
| 4,110,895 | 9/1978 | Mitsui | 29/564.2 |
| 4,464,826 | 8/1984 | Bair | 29/732 X |
| 4,524,507 | 6/1985 | Hara et al. | 29/564.2 |
| 4,578,853 | 4/1986 | Würth | 29/598 |
| 4,586,236 | 5/1986 | Jones | 29/564.6 X |
| 4,597,168 | 7/1986 | Oboshi et al. | 29/596 |
| 4,602,427 | 7/1986 | Britting | 29/738 X |
| 4,619,028 | 10/1986 | Neuenschwander | 29/33 L |
| 4,738,020 | 4/1988 | Neuenschwander | 29/714 X |

FOREIGN PATENT DOCUMENTS

| | | | |
|---|---|---|---|
| 77647 | 5/1985 | Japan | 29/738 |
| 1014096 | 4/1983 | U.S.S.R. | 29/738 |

Primary Examiner—William Briggs
Attorney, Agent, or Firm—Basile and Hanlon

[57] ABSTRACT

A proximity switch actuated by a press driven plunger is employed to generate a control signal at a predetermined point in the operating cycle of a high-speed stamping press when a press carried punch is at a precisely predetermined elevation above the die surface. Locating devices are provided for accurately locating the plunger at selected elevations relative to the die surface to establish an initial setting for the triggering of the proximity switch and to enable a resurfacing of the plunger concurrently with the sharpening of the die so that resetting of the proximity switch after a sharpening of the die is not required.

5 Claims, 2 Drawing Sheets

CONTROL FOR LAMINATION STAMPING APPARATUS

BACKGROUND OF THE INVENTION

I. Field of the Invention

The present invention is directed to a proximity sensing arrangement employed as a control in a machine for manufacturing laminated cores for dynamo-electric machines.

II. Description of the Prior Art

Lamination stamping machines for which the proximity sensing apparatus of the present invention is designed are generally well known in the prior art. Generally speaking, such machines take the form of a progressive die through which a strip of sheet metal stock is advanced through successive die stations at which various openings, apertures and tab-like projections are formed, and then to a final station where the laminations are punched from the stock into a rotary lamination receiving die. Typical examples of such prior art apparatus are shown in U.S. Pat. Nos. to Mitsui 4,110,895; Wurth 4,578,853; and Oboshi et al. 4,597,168.

In most induction motor rotors, it is necessary that each lamination within the assembled rotor core be rotatively offset about the rotor axis from the adjacent lamination. This rotative offset produces what is referred to as a skew angle in the assembled core. The apparatus disclosed in the above-identified Mitsui U.S. Pat. No. 4,110,895, as well as other prior art machines, accomplishes the desired rotational offset between adjacent lamina by feeding the lamina as punched from the sheet metal stock into a tightfitting bore in a rotatable die. A mechanical linkage actuated by downward movement of the punch rotates the rotatable die through the desired angular increment as the punch descends.

In addition to rotating the rotatable die prior to the addition of each lamina to the stack of lamina being built up in the die to achieve the desired skew angle, rotation of the stack may also be performed to compensate for variations in thickness in the metal stock from which the laminations are formed. Such variations in thickness can occur both longitudinally and transversely of the strip of sheet metal stock. If such variations are severe, and the thicker edges of successive lamina are stacked upon each other, an unsymmetrical rotor will be produced. If, however, the stack is rotated 180° prior to the addition of each lamina to the stack, the thickness variations will be largely canceled out. This problem has been addressed by the prior art; see, for example, Bergmann U.S. Pat. No. 3,823,460 and Neuenschwander U.S. Pat. No. 4,619,028. In recent years, specialized electric drive motors capable of rapid and precise, intermittent, incremental, rotative steps have become available for accomplishing such die rotation. These motors, combined with computerized control systems show great promise and offer many advantages over mechanical arrangement, such as that of U.S. Pat. No. 4,110,895 referred to above.

However, desired rotor core production rates require high-speed operation of the stamping machine and production goals of 300 strokes per minute pose problems, particularly if, within a stroke, the die must be rotated both to set skew angle and to compensate for thickness variation. At 300 strokes per minute, a single stroke is completed every 0.2 seconds (200 milliseconds). For a certain portion of this time period, the punch will be projecting into or through the sheet metal stock and certain manipulative steps which must be performed within a stroke cycle cannot be commenced until the punch is retracted clear of the metal strip.

Presently available proximity switches or proximity sensors may be employed to accurately signal when the rapidly moving punch is at any selected position within its cycle. Such proximity sensors are well adapted to produce a control signal when the punch is at a precisely selected location in its cycle; however, the initial setup time increases with the degree of precision desired and a precise setting which will result in the triggering of the proximity switch when the punch is at a precisely selected position within a stroke cycle measured in milliseconds can require several hours. Because the die surface must be ground periodically to sharpen the die edges, usage of the die surface as a reference point for the location of the proximmity switch triggering point will ordinarily require a complete repetition of the initial setup procedure for the switch each time the die is sharpened.

The present invention is especially directed to a proximity switch arrangement which may be precisely set with reference to the die surface and does not require resetting upon sharpening of the die.

SUMMARY OF THE INVENTION

In accordance with the present invention, a plunger is mounted in the base at a location closely adjacent a side of the die for vertical reciprocatory movement along a fixed path. The plunger is spring-biased upwardly relative to the base to an upper end limit of movement established by the abutment of a flange on the plunger with a downwardly facing shoulder on the base. When at its upper end limit of movement, the upper end of the plunger projects upwardly well above the level of the horizontal upper surface of the die. The plunger is located in vertical alignment with a downwardly projecting probe or abutment on the vertically reciprocable punch carrier so that vertical reciprocation of the punch causes the probe to drive the plunger in a corresponding vertical reciprocatory movement.

A proximity sensor or switch is mounted in the die base adjacent the path of movement of the lower end of the plunger. The sensing element of the proximity switch is so located relative to the path of movement of the lower end of the plunger that when the plunger moves upwardly beyond a precisely determined point relative to the base, the proximity switch will clsoe or shift conditions to signal the control system to initiate a particular step in the operational cycle of the die. The signal generation effectively tells the control system that the punch has been withdrawn from the die to a selected clearance so that the die may be rotated without interference from the punch. The signal may also initiate other functions of the machine.

Because the punch may be reciprocated at speeds of the order of 300 or more strokes per minute, cycle time is extremely limited and the setting of the proximity switch to trigger is precisely related to the location of the punch relative to the die so that triggering can occur at the earliest possible instant that adequate clearance between punch and die surface occurs. In a typical arrangement, for stock of .025 inch nominal thickness triggering may be set to occur when the upwardly moving punch is 0.0300 inch above the die surface.

The initial setup of this sytem is performed by mounting a setup block having a flat bottom surface upon the surface of the die to project outwardly into the path of the plunger. A flat recess 0.0300 inch deep is cut into the bottom surface of the setup block and the upper end of the plunger is biased upwardly by its biasing spring into engagement with the recessed surface. The proximity switch is then adjusted until its position is established at the precise triggering point with the plunger at the position established by the setup block.

The plunger is slidably received within a mounting block which is fixedly mounted on the die base and the mounting block and plunger are formed with aligned horizontal bores into which a dowel pin may be inserted to locate the plunger at a fixed position at which its upper surface is truly flush with the upper surface of the die. When the die is sharpened by grinding its upper surface, the plunger is vertically held, by the dowel pin described above, and the upper surface of the plunger is refinished during the die grinding operation so that the same depth of metal is ground from both the die surface and the upper surface of the plunger. Because the relationship between the upper surface of the plunger and the upper surface of the die is not altered during the die sharpening operation, there is no necessity of resetting the proximity switch after the sharpening operation.

Other objects and features of the invention will become apparent by reference to the following specification and to the drawings.

DESCRIPTION OF THE PREFERRED EMBODIMENT

Figure 1:
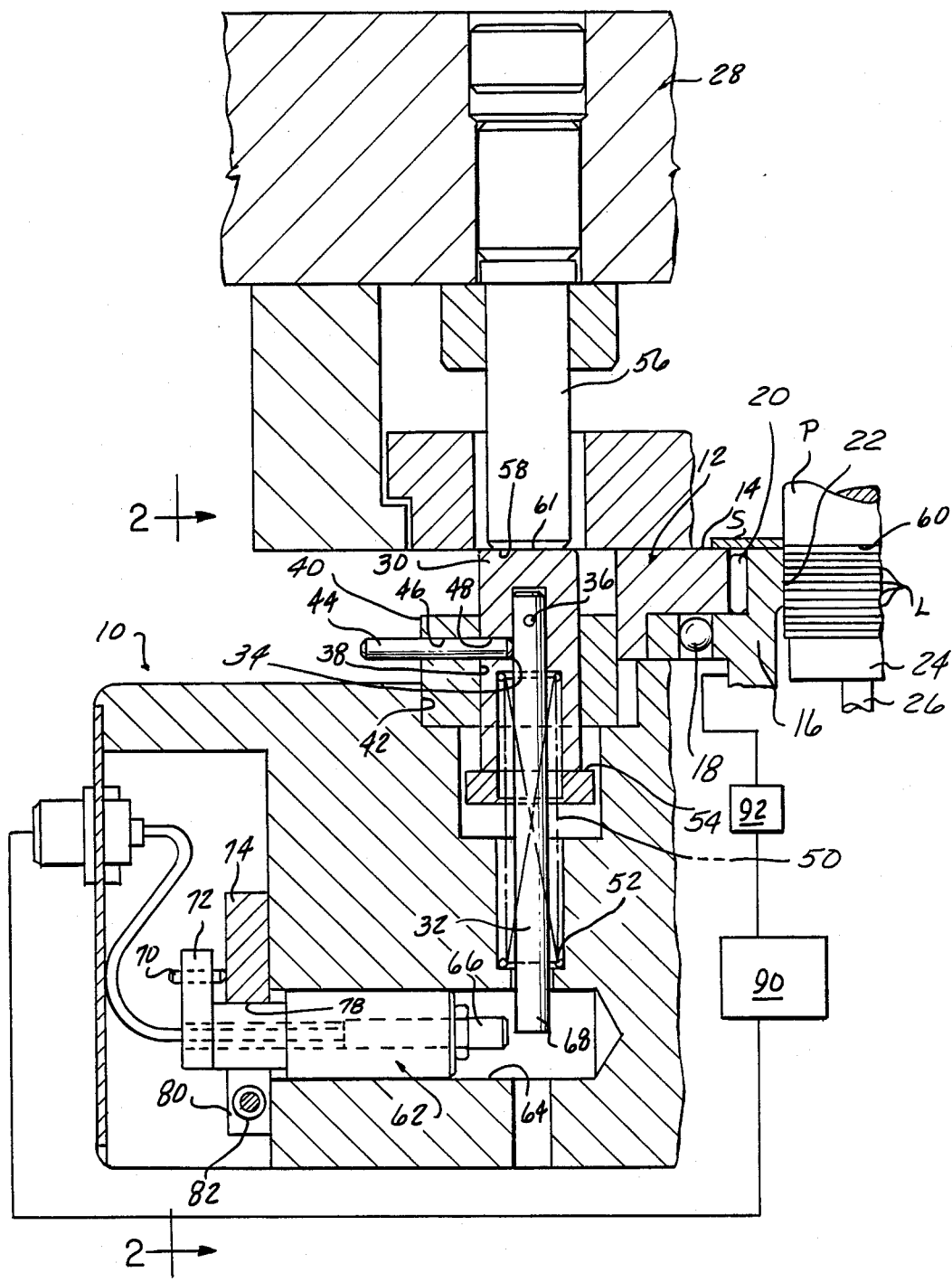
FIG. 1 is a cross-sectional view taken in a vertical plane showing a proximity switch control apparatus embodying the present invention together with portions of a typical lamination stamping apparatus.

In FIG. 1, there are shown in section portions of a typical stamping press employed to assemble laminated cores for electric motor rotors. Such machines are well known in the prior art. The press includes a stationary base or die bed 10 upon which is fixedly mounted a relatively massive die plate, a small portion of which is designated generally 12 in FIG. 1, having a flat, horizontal upper surface 14. In the particular section shown in the drawing, a rotatable die 16 is supported for rotation about a vertical axis within die plate 12 as by bearings 18, 20.

In the laminated rotor core assembly machines, the rotatable die 16 is the final station of a progressive die at which circular rotor lamina L which have had various openings, tabs, etc. formed in them at preceding die stations are punched from a strip of sheet metal stock S and forced by the punch P into a tight-fitting bore 22 in the rotatable die 16. The bore 22 receives the laminations L with a tight friction fit and the individual lamina L are stacked one upon each other as shown in FIG. 1, the stack being supports from beneath by a base plate 24 typically carried upon the piston rod 26 of an air cylinder, not shown.

Punch P is fixedly mounted in and projects downwardly from a punch carrier 28 which is mounted above the die and driven in vertical reciprocatory movement by conventional means well known in the art, and thus not illustrated. Present-day, high-speed presses are capable of driving a punch carrier carrying punches for a four-station, progressive die at speeds in the order of 300 strokes per minute or more. Typical strip stock thicknesses might be a nominal 0.025 inch. A punch stroke amplitude of about one inch is common and the punch, at the lower end limit of its stroke, typically will project about 0.02 inch below the upper surface 14 of the die.

As described in various prior art patents referred to above, in the assembly of a laminated rotor core, it is necessary to angularly offset each of the individual lamina L relative to the underlying lamina to achieve a desired skew angle in the assembled rotor. This rotative offset of one lamina with respect to the next adjacent lamina typically is of the order of 10° to 15° and is achieved by rotating the rotatable die 16 through the desired angle at a point in the punch-press cycle prior to the feeding of the next successive lamina onto the stack by the punch.

In addition to the stack rotation to establish skew angle described above, it is often desirable to rotate the stack prior to the insertion of successive lamina to compensate for thickness variations in the strip stock S from which the individual lamina L are punched. Rotating to compensate for thickness variation is discussed in some detail in Neuenschwander U.S. Pat. No. 4,619,028; see also Bergmann U.S. Pat. No. 3,823,460. Rotation of the stack through 180° prior to the insertion of each lamina will provide completely adequate compensation for stock thickness variation.

However, a press speed of 300 strokes per minute translates into a cycle time of 200 milliseconds for each reciprocatory cycle of the press, and the speed of presently available DC servo motors employed to drive the rotatable die in rotation is stretched to the limit to accomplish the desired rotation within that portion of the 200 millisecond cycle during which the punch is disengaged from the stock. Accordingly, it is essential that the necessary rotation of the rotatable die be commenced at the earliest possible instant, and the plunger proximity switch apparatus herein disclosed is especially devised for that purpose.

The plunger-proximity switch apparatus of the present invention includes a vertically elongate plunger assembly including an outer plunger sleeve member 30 and an elongate plunger rod 32 snugly received within a bore 34 in sleeve 30 and axially positioned within bore 34 as by a pin 36. Sleeve 30 is slidably received within a bore 38 in a mounting block 40 fixedly secured as by bolts, not shown, in a recess 42 in base 10. In FIG. 1, a dowel pin 44 is shown seated in aligned bores 46, 48 respectively in block 40 and sleeve 30 to vertically position sleeve 30 relative to block 40. This positioning of sleeve 30 by dowel pin 44 is employed only during a die sharpening operation, to be described below. Dowel pin 44 is withdrawn during normal operation of the apparatus so that sleeve 30 is free to move up and down in vertical reciprocation within bore 38.

A compression spring 50 is engaged between sleeve 30 and a shoulder 52 in die base 10 to resiliently bias sleeve 30 upwardly at all times. Upward movement of sleeve 30 is limited by a flange 54 formed on the sleeve which will engage the underside of block 40.

During operation of the press, sleeve 30 and its attached rod 32 are driven upwardly and downwardly in vertical reciprocation by a probe 56 fixedly mounted upon and projecting downwardly from punch carrier 28. The flat lower surface 58 of probe 56 is accurately aligned horizontally with the bottom surface 60 of punch P. Surface 58 of the probe normally bears against a flat upper surface 61 of sleeve 30.

Figure 2:
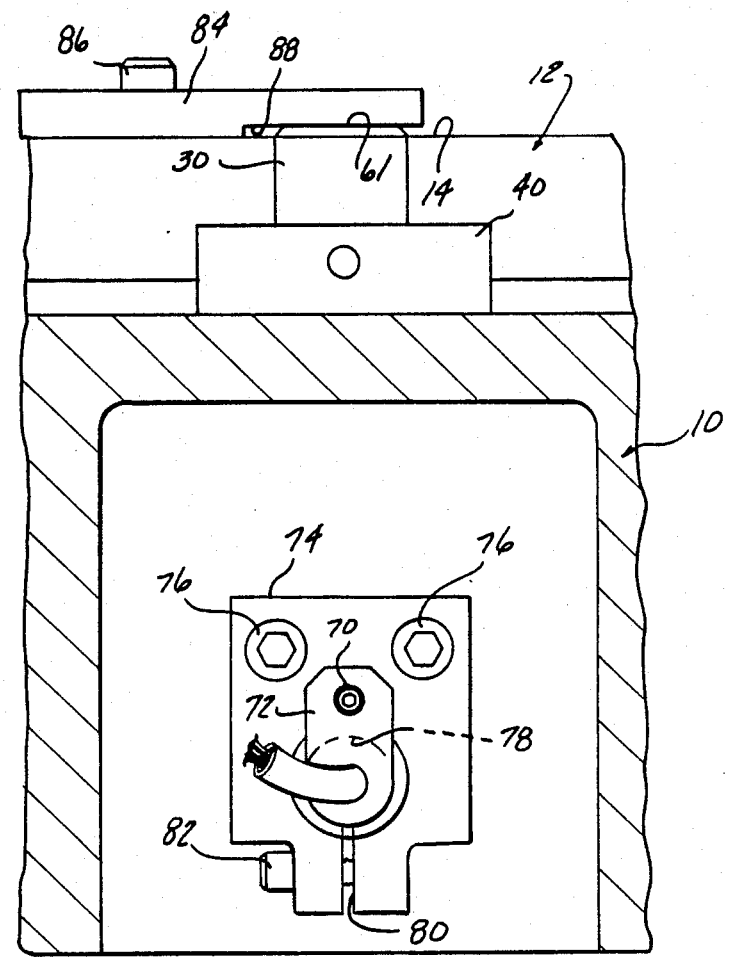
FIG. 2 is a side elevational view of the apparatus of FIG. 1, with certain parts removed or omitted.

A proximity switch 62 of a known, commercially available construction is mounted within a bore 64 in die base 10 with the sensing element 66 of switch 62 located closely adjacent the path of movement of the lower end 68 of plunger rod 32. Switch 62 is axially adjusted within bore 64 by a set screw 70 threadably received within adjustment block 72 fixedly mounted on that end of switch 62 which projects from bore 64. The right-hand end of set screw 70 bears against the face of a clamping block 74 fixedly secured to die base 10 as by bolts 76 (FIG. 2) having a bore 78 receiving switch 62. As best seen in FIG. 2, that portion of clamping block below bore 78 is split as at 80 and a clamping screw 82 may be tightened to clamp switch 62 at an axially adjusted position within bore 64.

For purposes of explanation, it may be assumed that proximity switch 62 is a normally closed switch which will shift to an open position at any time when the lower end 68 of rod 32 is within a predetermined distance from the sensing element 66 of switch 62. During operation of the press, probe 56 drives sleeve 30 and rod 32 in a vertical reciprocatory stroke so that the vertical position of the lower end of rod 32 is an accurate indicator of the position of the lower end of punch P relative to the upper surface 14 of the die. Because the metal stock S from which the individual lamina L are punched rests upon die surface 14, the vertical position of rod 32 likewise is an indicator of the location of surface 60 of the punch relative to stock S.

Because it is not desired to initiate a rotation of rotatable die 16 until the upwardly moving punch P has cleared stock S, the proximity switch 62 is set to shift when the lower surface 60 of punch P has moved upwardly to a position 0.030 inch above the upper surface 14 of the die. This setting would be employed where the strip stock S has a nominal 0.025 inch thickness, the 0.005 inch discrepancy between nominal stock thickness and the actuating point of the punch accommodating any thickness variation which may be present in stock S.

To initially set the proximity switch to trigger when punch P is at an elevation of 0.030 inch above die surface 14, a setup block 84 (FIG. 2) is fixedly mounted upon die surface 14 as by bolts 86 to project outwardly from the side of the die into overlying relationship with sleeve 30. The flat undersurface of block 84 is formed with a recess 88 of a depth equal to the desired punch clearance—0.030 inch in the present example—and the flat upper surface 61 of plunger sleeve 30 is resiliently biased upwardly against the surface of recess 88 to accurately locate the top surface 61 of the sleeve 0.030 inch above die surface 14. Proximity switch 62 is then adjusted so that is just at the threshold of triggering with sleeve 30 and rod 32 at the vertical position established by setup block 84. Accurate setting of the proximity switch requires extreme care and frequently a substantial amount of time.

The switch is connected, as schematically illustrated in FIG. 2, to a computerized controller 90 which in turn controls the drive 92 employed to rotate rotatable die 16. The computer of the controller 90 will receive appropriate inputs to establish the desired angle of rotation while proximity switch 62 transmits a signal to the computer which tells the computer when the desired rotation may be commenced. In the arrangement described above, initiation of the rotation of rotatable die 16 is delayed until the punch P has moved in an upward stroke to an elevation 0.030 inch above the surface of die 14.

After an extended period of use, it is necessary to sharpen the edges of the various die openings, and this is accomplished by grinding the entire upper surface 14 of the die plate 12 and rotatable die 16. This removal of metal from upper surface 14 of the die will alter the original proximity switch setting because the point in the press cycle at which the triggering of the proximity switch is set to occur will now find the punch at a distance above the die equal to .030 inch plus the depth of metal (typically about 0.010 inch) removed from the top of the die by the sharpening operation. To avoid the necessity of resetting the proximity switch, at the time the die surface is ground, the dowel pin 44 is inserted as shown in FIG. 1 to locate the upper surface 61 level with the as yet unground upper surface 14 of the die. During the grinding operation, the upper surface 61 of sleeve 30 is ground at the same setting of the grinder as is employed on surface 14 so that exactly the same depth of metal is ground from surface 61 as is ground from surface 14. This preserves the original relationship between the vertical position of plunger sleeve 30 and hence plunger rod 32 and surface 14 of the die so that triggering of the proximity switch will continue to occur when punch P is at the selected elevation above the ground surface 14 of the die.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. In a stamping die apparatus including a stationary base, a die having a horizontal upper surface mounted on said base for rotation about a fixed vertical axis, said die having a die opening extending downwardly from said upper surface, feed means cyclically advancing a strip of sheet metal stock of a known nominal thickness in step-by-step movement across said upper surface into overlying relationship with said opening, punch means mounted above said die means for vertical reciprocatory movement and operable during a downward stroke to punch a lamination from said strip and to insert said lamination downwardly into said opening, drive means for driving said die through a selected angle of rotation about said axis between the insertion of successive laminations into said opening by said punch means, and control means for synchronizing the operation of said feed means and said drive means with the reciprocatory movement of said punch means;

the improvement wherein said control means comprises vertically elongate plunger means having an upper and a lower end and mounted in said base for reciprocatory movement along a fixed vertical path, said plunger means being movable along said fixed path between an upper end limit wherein said upper end projects above said upper surface of said die means by a distance greater than the nominal thickness of said metal sheet stock and a lower limit wherein said upper end is spaced below said upper surface, a proximity sensor mounted in said base and having a sensing element located adjacent the path of movement of the lower end of said plunger menas, said sensor being operable when said lower end of said plunger means is within a predetermined, fixed distance from said sensing element to establish a first control condition and being operable when said lower end is at a distance from said sensing element equal to or greater than said fixed distance to establish a second control condition, means for fixedly positioning said proximity sensor in said base at a location such that when said lower end of said plunger means is at said fixed distance from said sensing element, said upper end is at a selected distance above said surface approximately equal to said nominal thickness, probe means fixedly mounted on and projecting downwardly from said punch means engageable with said upper end of said plunger means for driving said plunger means in reciproactory movement synchronized with the reciprocation of said punch means, and means in said control means for causing said drive means to initiate a selected angular increment of rotation of said stack when said proximity sensor shifts from msaid first to said second control condition.

2. The invention defined in claim 1 wherein said plunger means comprises a plunger member, spring means biasing said plunger member upwardly relative to said base, and abutment means on said base engageable with said plunger member to establish said upper end limit.

3. The invention defined in claim 1 wherein said upper end of said plunger means is a horizontal surface and said control means further comprises detachable locating means for fixedly locating said horizontal surface of said upper end of said plunger means at a predetermined position relative to said upper surface of said die means.

4. The invention defined in claim 3 wherein said locating means comprises a setup block having a flat bottom surface, means for detachably fixedly mounting said block upon said upper surface of said die with said bottom surface projecting from said upper surface into overlying relationship with the upper end of said plunger means, and means defining a recess of a predetermined depth in said bottom surface engageable by the upper end of said plunger means.

5. The invention defined in claim 3 wherein said locating means comprises a mounting block fixedly mounted on said base slidably mounting said plunger means for reciprocation along said fixed vertical path, and detachable pin means insertable into aligned horizontal bores in said mounting block and plunger means to lock said plunger means in a predetermined position on said fixed vertical path.

* * * * *